(12) United States Patent
Toshimitsu

(10) Patent No.: US 12,470,394 B2
(45) Date of Patent: Nov. 11, 2025

(54) ELECTRONIC APPROVAL SYSTEM, ELECTRONIC APPROVAL SERVER, AND COMPUTER-READABLE STORAGE MEDIUM

(71) Applicant: KABUSHIKI KAISHA TOSHIBA, Minato-ku (JP)

(72) Inventor: Kiyoshi Toshimitsu, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 336 days.

(21) Appl. No.: 18/174,540

(22) Filed: Feb. 24, 2023

(65) Prior Publication Data

US 2023/0308282 A1   Sep. 28, 2023

Related U.S. Application Data

(63) Continuation of application No. PCT/JP2021/031942, filed on Aug. 31, 2021.

(30) Foreign Application Priority Data

Sep. 2, 2020   (JP) .................................. 2020-147749

(51) Int. Cl.
*H04L 9/40* (2022.01)
*H04L 9/08* (2006.01)
*H04L 9/32* (2006.01)

(52) U.S. Cl.
CPC .......... *H04L 9/3231* (2013.01); *H04L 9/0825* (2013.01); *H04L 9/0869* (2013.01)

(58) Field of Classification Search
CPC ... H04L 9/3231; H04L 9/0825; H04L 9/0869; H04L 9/0897; G06F 21/32; G06F 21/64
See application file for complete search history.

(56) References Cited

U.S. PATENT DOCUMENTS 10,333,707 B1 *  6/2019   Pathak ................. H04L 63/061
10,659,457 B2    5/2020   Ito et al.
(Continued)

FOREIGN PATENT DOCUMENTS

| CN | 111428218 A | 7/2020 |
|----|----|----|
| JP | 2004-214792 A | 7/2004 |

(Continued)

OTHER PUBLICATIONS

Japan Patent Office, Int'l Search Report in PCT/JP2021/031942, 2 pages (Oct. 26, 2021).

(Continued)

*Primary Examiner* — Thaddeus J Plecha
(74) *Attorney, Agent, or Firm* — Finnegan, Henderson, Farabow, Garrett & Dunner, LLP

(57) ABSTRACT

According to an embodiment, an electronic approval system comprising at least one electronic approval device and an electronic approval server. The electronic approval device includes a biometric authentication unit and a security chip. The biometric authentication unit performs biometric authentication. The security chip generates reliability confirmation information using a private key stored in advance if a result of the biometric authentication is normal, and transmits the reliability confirmation information to the electronic approval server via the information processing device. The electronic approval server includes a processor. The processor stores an electronic approval record indicating that approval has been successfully performed in the electronic approval device based on a public key corresponding to the private key and the reliability confirmation information.

8 Claims, 11 Drawing Sheets

(56) References Cited

U.S. PATENT DOCUMENTS

| | | |
|---|---|---|
| 2010/0191967 A1 | 7/2010 | Fujii et al. |
| 2011/0179289 A1* | 7/2011 | Guenther ............... G06F 21/83 |
| | | 713/189 |
| 2018/0115546 A1 | 4/2018 | Ito et al. |
| 2020/0195660 A1 | 6/2020 | McIver et al. |
| 2020/0388094 A1* | 12/2020 | Lee .................... H04L 63/0861 |
| 2022/0038291 A1 | 2/2022 | Hong et al. |

FOREIGN PATENT DOCUMENTS

| | | |
|---|---|---|
| JP | 4042564 B2 | 2/2008 |
| JP | 4847077 B2 | 12/2011 |
| JP | 2014-26311 A | 2/2014 |
| JP | 2018-74205 | 5/2018 |
| JP | 2018-74205 A | 5/2018 |
| WO | WO 2019/093573 A1 | 5/2019 |

OTHER PUBLICATIONS

European Patent Office, Office Action in EP App. No. 21864332.8, 9 pages (Sep. 13, 2024).
Japan Patent Office, Office Action in JP App. No. 2020-147749, 5 pages, and machine translation, 5 pages (Oct. 29, 2024).
Intellectual Property Office of Singapore, Office Action in SG App. No. 11202301426S, (Aug. 18, 2025).

* cited by examiner

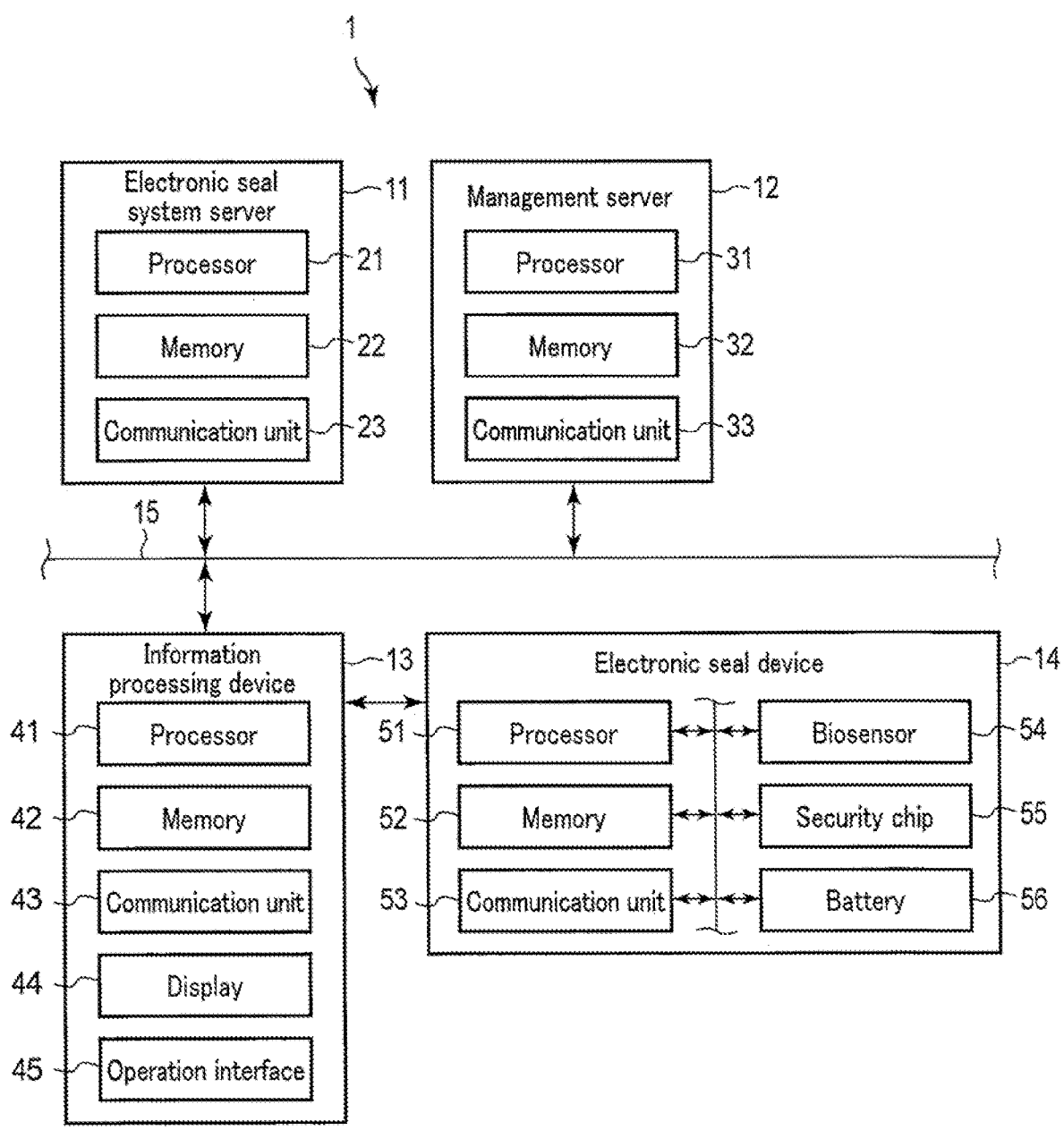
F I G. 2

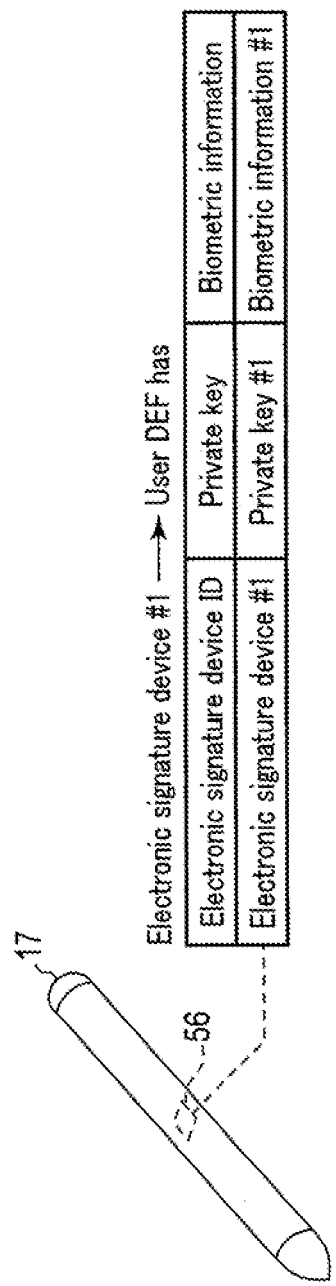
F I G. 10

ELECTRONIC APPROVAL SYSTEM, ELECTRONIC APPROVAL SERVER, AND COMPUTER-READABLE STORAGE MEDIUM

CROSS REFERENCE TO RELATED APPLICATIONS

This application is a Continuation Application of PCT Application No. PCT/JP2021/031942, filed Aug. 31, 2021 and based upon and claiming the benefit of priority from Japanese Patent Application No. 2020-147749, filed Sep. 2, 2020, the entire contents of all of which are incorporated herein by reference.

FIELD

Embodiments described herein relate generally to an electronic approval system, an electronic approval server, and a computer-readable storage medium.

BACKGROUND

An electronic seal system in which imprint data is inserted into an electronic document by an electronic seal device is put into practical use. The electronic seal device performs biometric authentication using finger biometric characteristics, etc. and inserts imprint data into an electronic document according to a result of the biometric authentication. The electronic seal device is thus configured to prevent anyone other than the owner (registrant) of the electronic seal device from using the electronic seal device.

However, the electronic seal device is configured to insert imprint data associated with the registrant of the electronic seal device into an electronic document, and has a problem that it cannot handle the case of inserting imprint data associated with organizations, departments, associations, etc. into the electronic document.

There is another electronic seal system which prevents electronic documents from being altered by applying a seal mistakenly or falsely, and the like. However, this system has a problem that its versatility is low because a terminal for an electronic seal device (a terminal for displaying electronic documents) is a dedicated terminal.

BRIEF DESCRIPTION OF THE DRAWING(S)

FIG. 2 is an illustration of an example of each component of the electronic approval system according to the first embodiment.

FIG. 10 is an illustration of an example of data stored in an electronic signature device of the electronic approval system according to the third embodiment.

DETAILED DESCRIPTION

According to an embodiment, an electronic approval system comprising at least one electronic approval device and an electronic approval server. The electronic approval device includes a first communication unit, a biometric authentication unit, and a security chip. The first communication unit communicates with the electronic approval server via an information processing device. The biometric authentication unit performs biometric authentication. The security chip generates reliability confirmation information using a private key stored in advance if a result of the biometric authentication is normal, and transmits the reliability confirmation information to the electronic approval server via the information processing device. The electronic approval server includes a second communication unit and a processor. The second communication unit communicates with the electronic approval device via the information processing device. The processor stores an electronic approval record indicating that approval has been successfully performed in the electronic approval device based on a public key corresponding to the private key and the reliability confirmation information.

Embodiments will be described below with reference to the drawings. Note that each of the drawings is a schematic diagram to promote understanding of the embodiments. The shape, dimensions, ratio, etc. of the configuration shown in each of the drawings can be changed in a timely manner according to the specifications of the configuration.

First Embodiment

Figure 1:
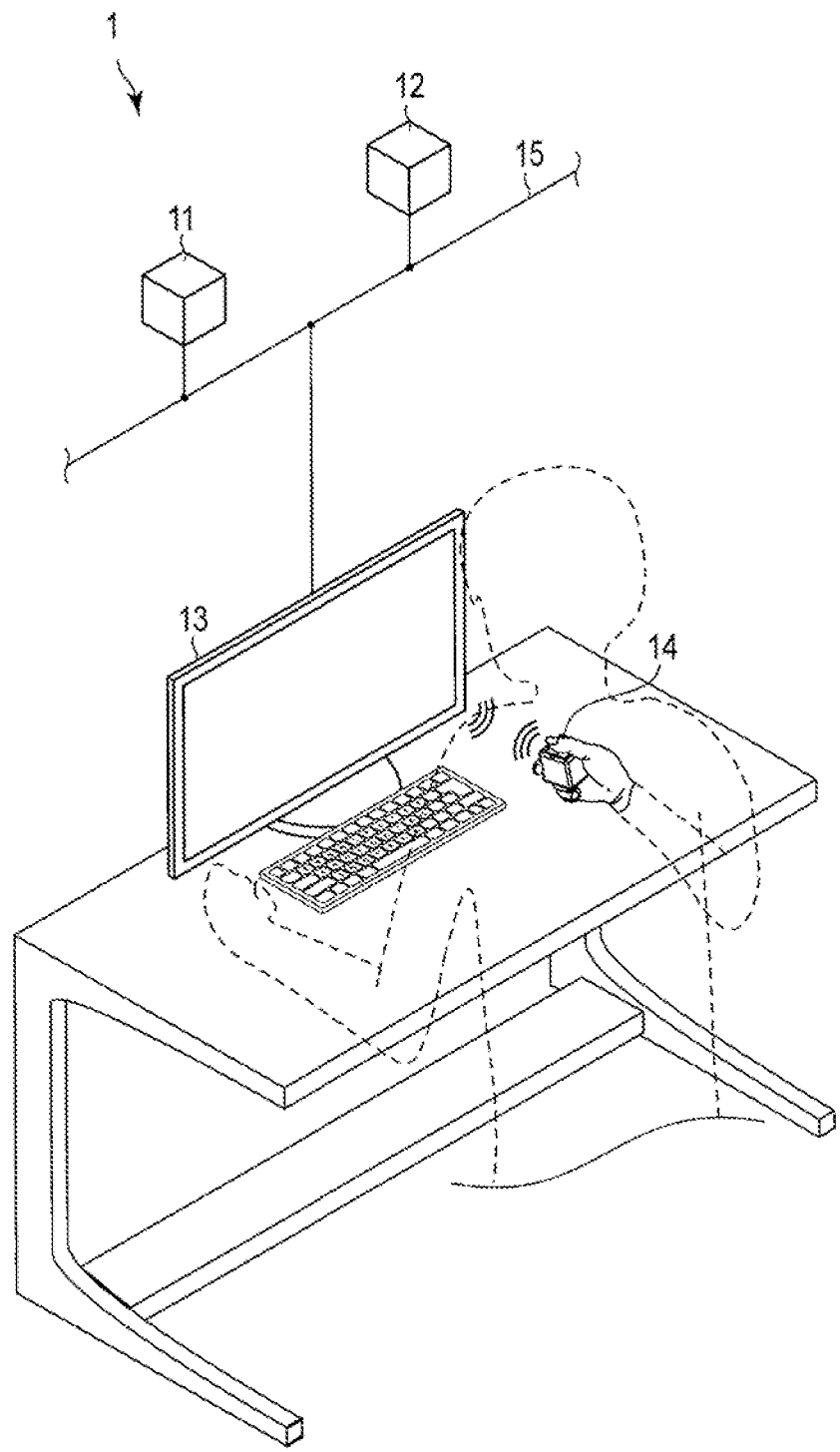
FIG. 1 is an illustration of a schematic configuration example of an electronic approval system according to a first embodiment.

FIG. 1 is an illustration of a schematic configuration example of an electronic seal system 1 according to a first embodiment. FIG. 2 is an illustration of an example of each component of the electronic seal system 1 according to the first embodiment.

The electronic seal system 1 is a form of an electronic approval system that electronically provides an approval record (electronic approval record) for electronic documents (document data). The electronic seal system 1 is a system that gives an electronic imprint image to document data as an electronic approval record. The electronic seal system 1 includes an electronic seal system server 11, a management server 12, an information processing device 13, at least one or more electronic seal devices 14, and the like. The electronic seal system server 11 is an example of an electronic approval server, and the electronic seal device 14 is an example of an electronic approval device.

In the electronic seal system 1, when the electronic seal device 14 performs an operation for approval (e.g., biometric authentication), the electronic seal system server 11 and management server 12 determine whether the operation of the electronic seal device 14 is normal. If they determine that the operation of the electronic seal device 14 is normal, the electronic seal system server 11 inserts the electronic imprint image into the document data.

The electronic seal system server 11, management server 12 and information processing device 13 communicate via a network 15. The network 15 is, for example, a public line. The electronic seal device 14 is configured to be communicable with the information processing device 13. The electronic seal device 14 is configured to be communicable with the electronic seal system server 11 via the information processing device 13.

First is a description of a configuration example of the electronic seal system server 11 and management server 12.

The electronic seal system server 11 is an electronic approval server that performs a process related to electronic approval. The electronic seal system server 11 includes a processor 21, a memory 22 and a communication unit 23.

The processor 21 is an arithmetic element that performs an arithmetic operation. The processor 21 is configured as a central processing unit (CPU), for example. The processor 21 performs various processes based on programs stored in the memory 22. The processor 21 transmits and receives data to and from the management server 12 and the information processing device 13 via the communication unit 23, network 15, and the like.

The memory 22 is a storage device that stores programs and data. The memory 22 includes one or more of, for example, a ROM that is a read-only nonvolatile memory, a RAM that stores data temporarily and a storage that stores data.

The communication unit 23 is configured to communicate with other devices. The communication unit 23 communicates with the management server 12 and the information processing device 13 via the network 15.

The processor 21 performs various processes related to electronic approval, which will be described later, based on a program (electronic approval program) stored in the memory 22.

The management server 12 is an electronic approval server that performs a process related to electronic approval. The management server 12 includes a processor 31, a memory 32 and a communication unit 33.

The processor 31 is an arithmetic element that performs an arithmetic operation. The processor 31 is configured as a central processing unit (CPU), for example. The processor 31 performs various processes based on programs stored in the memory 32. The processor 31 transmits and receives data to and from the electronic seal system server 11 via the communication unit 33, network 15, and the like.

The memory 32 is a storage device that stores programs and data. The memory 32 includes one or more of, for example, a ROM that is a read-only nonvolatile memory, a RAM that stores data temporarily and a storage that stores data.

The communication unit 33 is configured to communicate with other devices. The communication unit 33 communicates with the electronic seal system server 11 via the network 15. Note that the communication unit 33 of the management server 12 may be configured to communicate directly with the electronic seal system server 11 via a dedicated line, instead of communicating with the electronic seal system server 11 via the network 15.

The processor 31 performs various processes related to electronic approval, which will be described later, based on a program (electronic approval program) stored in the memory 32.

Next is a description of a configuration example of the information processing device 13.

The information processing device 13 relays the electronic seal system server 11 to the electronic seal device 14, outputs information to the user of the electronic seal device 14, accepts an operation input by the user of the electronic seal device 14, and the like. The information processing device 13 includes a processor 41, a memory 42, a communication unit 43, a display 44 and an operation interface 45.

The processor 41 is an arithmetic element that performs an arithmetic operation. The processor 41 is configured as a central processing unit (CPU), for example. The processor 41 performs various processes based on programs stored in the memory 42. The processor 41 transmits and receives data to and from the electronic seal system server 11 via the communication unit 43, network 15, and the like. The processor 41 also transmits and receives data to and from the electronic seal device 14 via the communication unit 43.

The memory 42 is a storage device that stores programs and data. The memory 42 includes one or more of, for example, a ROM that is a read-only nonvolatile memory, a RAM that stores data temporarily and a storage that stores data.

The communication unit 43 is configured to communicate with other devices. The communication unit 43 communicates with the electronic seal system server 11 via the network 15. In addition, the communication unit 43 performs wireless communication with the electronic seal device 14. Note that the communication unit 43 may be configured to include a USB connector that relays wired communication with the electronic seal device 14 via a USB, for example.

The display 44 displays a screen in response to a video signal input from a display control unit such as the processor 41 and a graphic controller (not shown).

The operation interface 45 is configured to accept an operation input by a user who operates the information processing device 13 (for example, the user of the electronic seal device 14). The operation interface 45 includes a variety of operating members. The operation interface 45 supplies the processor 41 with an operation signal corresponding to the operation of an operating member. The operating members include a touch sensor, a numeric keypad, a power key, a paper feed key, various function keys, a mouse, a keyboard, and the like. In addition, the touch sensor may be configured as a touch panel integrally with the display 44.

Next is a description of a configuration example of the electronic seal device 14.

The electronic seal device 14 is a device that is operated by a user to insert an electronic imprint image into document data. The electronic seal device 14 performs biometric authentication based on user's biometric information (e.g. fingerprints, vein patterns, iris, and facial features). The electronic seal device 14 includes a processor 51, a memory 52, a communication unit 53, a biosensor 54, a security chip 55 and a battery 56. The electronic seal device 14 may also include an indicator, a speaker or the like, which is not shown.

The processor 51 is an arithmetic element that performs an arithmetic operation. The processor 51 is configured as a central processing unit (CPU), for example. The processor 51 performs various processes based on programs stored in the memory 52. The processor 51 transmits and receives data to and from the information processing device 13 via the communication unit 53.

The memory 52 is a storage device that stores programs and data. The memory 52 includes one or more of, for example, a ROM that is a read-only nonvolatile memory, a RAM that stores data temporarily, and a storage that stores data.

The communication unit 53 is configured to communicate with other devices. The communication unit 53 performs wireless communication with the information processing device 13.

The biosensor 54 acquires user's biometric information. In the present embodiment, the biosensor 54 acquires user's fingerprints as an image.

The security chip 55 performs a process related to biometric authentication and generates data (reliability confirmation information to be described later) to be transmitted to the electronic seal system server 11. The security chip 55 is sometimes called a secure element. The security chip 55 include a processor, a memory, a random number generator, an encryption circuit, and the like.

The processor is an arithmetic element that performs a predetermined process. The processor performs biometric authentication in response to an input signal. The processor also controls random numbers generated by the random number generator. The processor also controls an encryption process to be performed by the encryption circuit.

The memory stores biometric information (e.g. feature points extracted and generated in advance from user's fingerprint image in this embodiment), which is used for the above biometric authentication. Note that the memory may be configured to store encrypted biometric information. In addition, the memory stores in advance an encryption key (private key) used in the encryption circuit.

The random number generator is configured to generate random numbers in accordance with the control of the processor. The random number generator generates random numbers of random length, for example, and pads and outputs the generated random numbers.

The encryption circuit performs an encryption process to encrypt data in accordance with the control of the processor. The encryption circuit uses the input encryption key to encrypt the input data and output the encrypted data (encryption data). For example, a private key, which is read out of the memory by the processor, is input into the encryption circuit as an encryption key. A random number, which is generated by the random number generator, is also input to the encryption circuit as data to be encrypted. In addition, the encryption circuit performs hash calculation as an encryption process, for example, and outputs a hash value as encryption data. That is, the encryption circuit is configured to perform hash calculations based on the private key and random numbers and output the hash value as encryption data.

The battery 56 is configured to supply power to each component of the electronic seal device 14. The battery 56 includes, for example, a DC-DC converter and a storage battery such as a lithium-ion secondary battery. The DC-DC converter converts the DC voltage of the output terminal of the storage battery into a voltage corresponding to the rated voltage of each component of the electronic seal device 14 and supplies it.

Note that the electronic seal device 14 may be configured to communicate with the information processing device 13 by wire. For example, the electronic seal device 14 may be configured to communicate with the information processing device 13 via a USB. In this case, the electronic seal device 14 includes a connector (USB connector) to which a USB cable is connected.

In addition, the electronic seal device 14 is operated by DC power that is supplied from the information processing device 13 via the USB cable. For this reason, the battery 56 may be excluded from the electronic seal device 14.

Next is a description of information stored in the electronic seal system server 11 and the management server 12.

Figure 3:
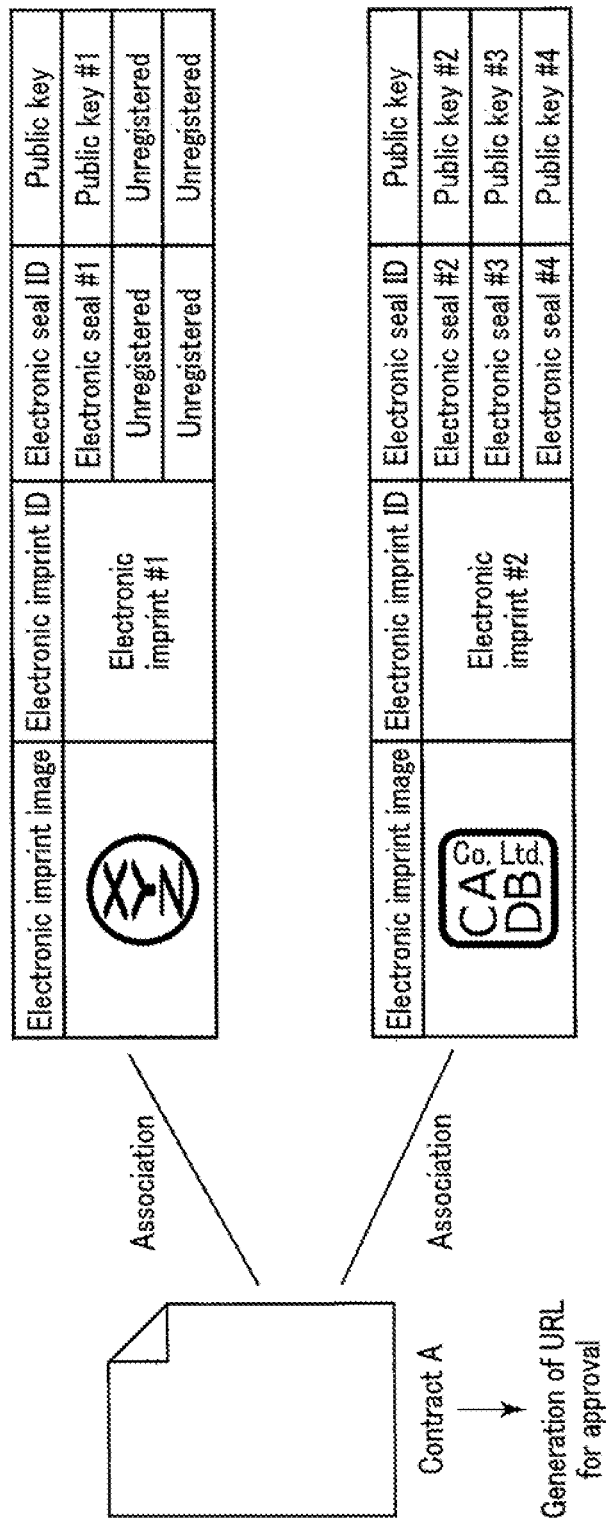
FIG. 3 is an illustration of an example of data stored in a server of the electronic approval system according to the first embodiment.

FIG. 3 is an illustration of the information stored in the memory 22 of the electronic seal system server 11 or the memory 32 of the management server 12.

The memory 22 of the electronic seal system server 11 or the memory 32 of the management server 12 stores document data to which electronic approval record ("contract A" in the example of FIG. 3) is to be given.

The memory 22 of the electronic seal system server 11 or the memory 32 of the management server 12 also stores data related to various electronic seals. In the example of FIG. 3, they store "electronic imprint image," "electronic imprint ID," "electronic seal ID" and "public key" in association with each other.

The electronic imprint image is a form of electronic approval record to be attached to document data. The electronic imprint image is formed as an image that is superposed (inserted) on, for example, document data and displayed.

The electronic imprint ID is identification information for identifying the electronic imprint image.

The electronic seal ID is identification information for identifying the electronic seal device 14.

The public key is an encryption key corresponding to a private key stored in the electronic seal device 14. The public key is used to authenticate the reliability confirmation information to be described later.

The present embodiment will be described on the assumption that the memory 22 of the electronic seal system server 11 stores the electronic imprint image and the electronic imprint ID in association with each other and the memory 32 of the management server 12 stores the electronic imprint ID, the electronic seal ID, and the public key in association with each other. The memory 22 of the electronic seal system server 11 also stores document data to which electronic approval record is to be given.

As shown in FIG. 3, an electronic imprint #1 and an electronic imprint #2 are associated with the document data of "contract A." The electronic imprint #1 and electronic imprint #2 are identification information of an electronic imprint image that needs to be inserted into the document data of "contract A."

Electronic seal #1 and public key #1 are associated with the electronic seal #1.

Electronic seal ID such as electronic seals #2, #3 and #4 and public keys #2, #3 and #4 are associated with the electronic imprint #2.

Note that a single electronic seal device 14 may be associated with a plurality of electronic imprint IDs.

Next is a description of information stored in the electronic seal device 14.

Figure 4:
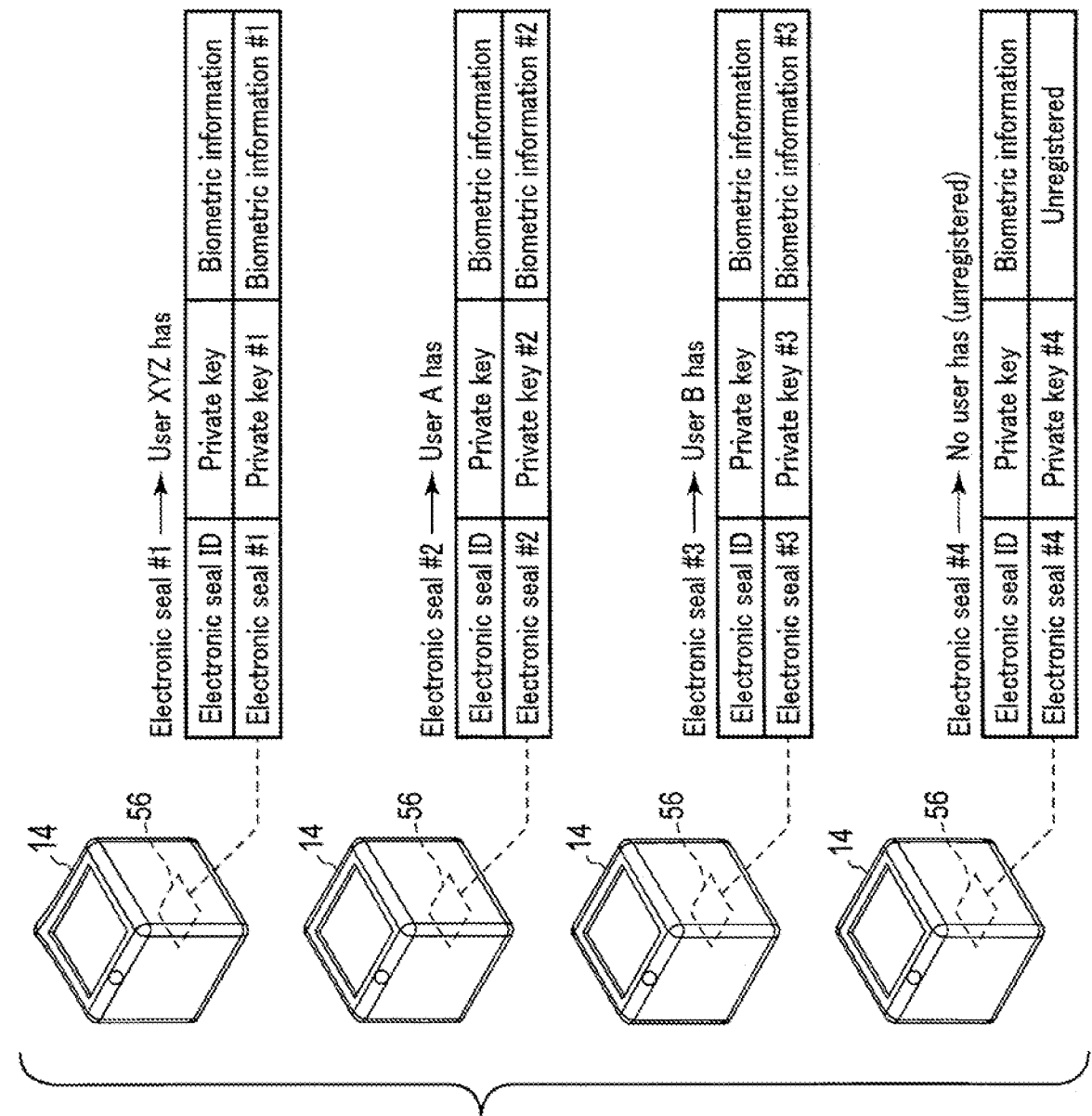
FIG. 4 is an illustration of an example of data stored in an electronic seal device of the electronic approval system according to the first embodiment.

FIG. 4 is an illustration of information stored in the security chip 55 of the electronic seal device 14.

As shown in FIG. 4, the security chip 55 of the electronic seal device 14 stores "electronic seal ID," "private key," "biometric information" and the like in association with each other. Note that the electronic seal device 14 may be configured such that the memory 52 stores one or more of the "electronic seal ID," "private key" and "biometric information."

The private key is an encryption key corresponding to a public key associated with the electronic seal ID of the electronic seal device 14 in the management server 12. The private key is used to generate reliability confirmation information to be described later.

The biometric information is information for use in biometric authentication. The biometric information is generated by, for example, extracting feature points from images of user's fingerprints in advance.

Assume that user XYZ has an electronic seal device 14 whose electronic seal ID is "electronic seal #1" as shown in FIG. 4. In this case, the memory of the security chip 55 stores "private key #1" and "biometric information #1" that is biometric information of the user XYZ. The "private key #1" is an encryption key corresponding to "public key #1" associated with the "electronic seal #1" in the management server 12.

Assume also that user A has an electronic seal device 14 whose electronic seal ID is "electronic seal #2." In this case, the biometric information of user A, "biometric information #2" and "private key #2" are stored in the memory of the security chip 55. The "private key #2" is an encryption key corresponding to "public key #2" associated with the "electronic seal #2" in the management server 12.

Assume also that user B has an electronic seal device 14 whose electronic seal ID is "electronic seal #3." In this case, the biometric information of user B, "biometric information #3" and "private key #3" are stored in the memory of the security chip 55. The "private key #3" is an encryption key corresponding to "public key #3" associated with the "electronic seal #3" in the management server 12.

Assume also that the electronic seal device 14 whose electronic seal ID is "electronic seal #4" is unregistered (not registered by a user). In this case, "private key #4" is stored in the memory of the security chip 55, and biometric information is blank. Note that the "private key #4" is an encryption key corresponding to a "public key #4" associated with the "electronic seal #4" in the management server 12.

In the electronic seal system 1, at least one electronic seal device 14 is provided for a user (authorized person). The authorized person gains access to a Web page for registration of the electronic seal device 14 by the information processing device 13. The authorized person can connect the electronic seal device 14 and the information processing device 13 to cause the biosensor 54 of the electronic seal device 14 to read the biometric information (fingerprint image) of the authorized person or a person who gives authority, and thus register biometric information in the security chip 55 of the electronic seal device 14. If the biometric information has been registered, the electronic seal device 14 transmits the fact that the biometric information has been registered to the electronic seal system server 11 via the information processing device 13. Accordingly, the electronic seal device 14 is validated in the electronic seal system server 11.

Next is a description of an example of the operation of the electronic seal system 1.

Figure 5:
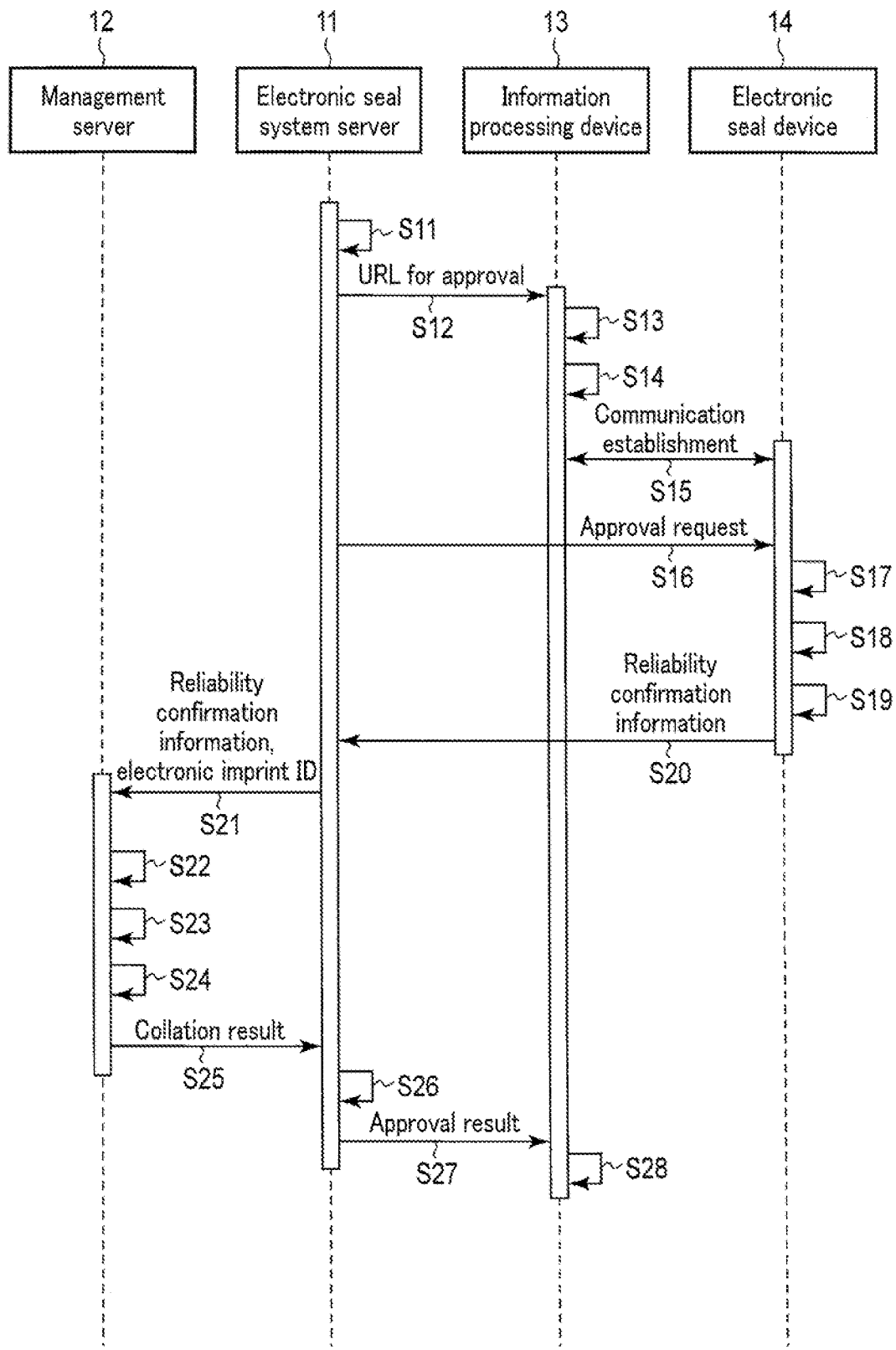
FIG. 5 is an illustration of an example of an operation of the electronic approval system according to the first embodiment.

FIG. 5 is a sequence diagram illustrating the operation of the electronic seal system 1. Note that FIG. 5 illustrates an example of a process related to an electronic imprint that can be inserted into document data by the approval of a single authorized person. Specifically, the example is the case of "electronic imprint #1" shown in FIG. 3.

The processor 21 of the electronic seal system server 11 generates a URL for approval based on document data and electronic seal ID associated with the document data (step S11). For example, on the Web page of the URL for approval, an approval screen is displayed showing the display based on the document data, information indicating a required electronic imprint image (e.g., electronic imprint ID), and information indicating an electronic seal device 14 for which approval is required (electronic seal ID).

For example, the processor 21 of the electronic seal system server 11 generates a URL for approval based on information transmitted from a terminal operated by a user who needs electronic approval (authorized person or other users). The information transmitted from the terminal contains information indicating at least an electronic imprint ID. The processor 21 transmits the URL for approval to the information processing device 13 operated by the user who needs electronic approval (holder of the electronic seal device 14) (step S12). Note that information indicating a destination of the transmission may be associated with the electronic seal device 14 (or the electronic seal ID).

The processor 41 of the information processing device 13 gains access to the URL for approval based on the operation of the operation interface 45, and displays an approval screen on the display 44 (step S13). The holder of the electronic seal device 14, that is, the authorized person thereof, visually checks the approval screen displayed on the display 44 to confirm that he or she is a user who needs to receive electronic approval. The holder of the electronic seal device 14 inputs an operation for electronic approval through the operation interface 45.

Upon receiving the operation on the approval screen (step S14), the processor 41 establishes communication with the electronic seal device 14 (step S15).

If communication is established between the information processing device 13 and the electronic seal device 14, the processor 21 of the electronic seal system server 11 transmits an approval request to the electronic seal device 14 via the information processing device 13 (step S16).

Upon receiving the approval request, the electronic seal device 14 performs biometric authentication (fingerprint authentication in this embodiment) (step S17). For example, the processor 51 of the electronic seal device 14 makes display to urge the authorized person to perform fingerprint authentication on an indicator, a speaker or a display 44 of the information processing device 13, which is not shown. The processor 51 activates the biosensor 54. The processor 51 acquires an image of authorized person's fingerprints by the biosensor 54. The processor 51 supplies the fingerprint image to the security chip 55. The security chip 55 performs biometric authentication based on preset biometric information (feature points extracted from the fingerprints) and input fingerprint image, and outputs a result to the processor 51.

If the result of biometric authentication is normal, the electronic seal device 14 generates random numbers using the random number generator of the security chip 55 (step S18). If the result of biometric authentication is normal, the processor 51 instructs the security chip 55 to generate random numbers. The security chip 55 generates random numbers using the random number generator and outputs the random numbers to the processor 51.

In addition, the electronic seal device 14 encrypts the random numbers using the encryption circuit of the security chip 55 (step S19). Specifically, the security chip 55 inputs the private key stored in advance and the random numbers into the encryption circuit, and acquires encrypted data in which the random numbers are encrypted by the private key.

More specifically, the security chip 55 performs a hash calculation based on the private key and the random numbers to acquires a hash value as the encrypted data. The security chip 55 outputs the encrypted data (hash value) to the processor 51.

The processor 51 of the electronic seal device 14 transmits the random numbers and encrypted data to the electronic seal system server 11 as reliability confirmation information via the information processing device 13 (step S20). That is, if the biometric authentication result is normal, the electronic seal device 14 transmits to the electronic seal system server 11 the reliability confirmation information that is generated using the private key stored by itself.

Upon receiving the reliability confirmation information from the electronic seal device 14, the processor 21 of the electronic seal system server 11 determines whether the authorized holder (authorized person) is approved in the electronic seal device 14, based on the reliability confirmation information and the already registered information. That is, the processor 21 determines whether to attach an electronic imprint image to document data, based on the already registered information such as "electronic imprint image," "electronic imprint ID," "electronic seal ID" and "public key" and the reliability confirmation information. Note that the document data and electronic imprint image, which are to be determined whether to impart an electronic imprint image, are electronic imprint image and document data of the electronic imprint ID used for generating the URL for approval in step S11.

First, the processor 21 of the electronic seal system server 11 transmits the reliability confirmation information received from the electronic seal device 14 and the electronic seal ID to the management server 12 (step S21).

The processor 31 of the management server 12 acquires from the memory 32 the public key associated with the electronic imprint ID transmitted from the electronic seal system server 11 (step S22).

The processor 31 decrypts the encrypted data (hash value) of the reliability confirmation information using the acquired public key (step S23).

The processor 31 collates the decrypted value of the encrypted data with the random number of the reliability confirmation information (step S24). If the decrypted value of the encrypted data coincides with the random number of the reliability confirmation information, the processor 31 determines that the collation result is normal. If the decrypted value of the encrypted data does not coincide with the random number of the reliability confirmation information, the processor 31 determines that the collation result is abnormal. Note that in the above example, a random number is used as data for reliability confirmation, but data other than the random number can be encrypted with a private key and the encrypted data can be used as reliability confirmation information. The same is true of the following examples.

The processor 31 transmits the collation result to the electronic seal system server 11 (step S25).

The processor 21 of the electronic seal system server 11 stores approval record based on the collation result from the management server 12 (step S26). If the collation result received from the management server 12 is normal, the processor 21 stores an electronic imprint image as electronic approval record in association with document data.

The processor 21 generates an approval result screen showing the approval result and transmits it to the information processing device 13 (step S27). For example, the processor 21 generates a screen in which an electronic imprint image is superposed on the display of document data, as the approval result screen.

The processor 41 of the information processing device 13 causes the display 44 to display a screen showing the received approval result (step S28). Accordingly, the authorized person who operates the information processing device 13, can confirm that the electronic approval record has been recorded normally in the electronic seal system server 11.

As described above, the processor 21 of the electronic seal system server 11 of the electronic seal system 1 stores the electronic approval record, based on the reliability confirmation information generated using the private key in the electronic seal device 14 and the collation result based on the public key corresponding to the private key. Thus, the electronic seal system 1 can store the record that the authorized person associated with the electronic seal device 14 has been approved, in association with the document data.

According to the foregoing configuration, the authorized person of the electronic imprint image is a pre-registered person, but the electronic imprint image is not limited to an imprint showing the individuals. In addition, as a terminal operated by the holder of the electronic seal device 14, a general-purpose information processing device 13 capable of communicating with the electronic seal device 14 and the electronic seal system server 11 can be used.

Furthermore, according to the foregoing configuration, the electronic seal system server 11 transmits the electronic seal ID and the reliability confirmation information received from the electronic seal device 14 to the management server 12 that is an external server, and receives a collation result from the management server 12. That is, there is no need for the electronic seal system server 11 to manage confidential information such as public keys for private keys. Therefore, the costs required for the security of the electronic seal system server 11 can be reduced.

Next is a description of another example of the operation of the electronic seal system 1 according to the first embodiment.

Figure 6:
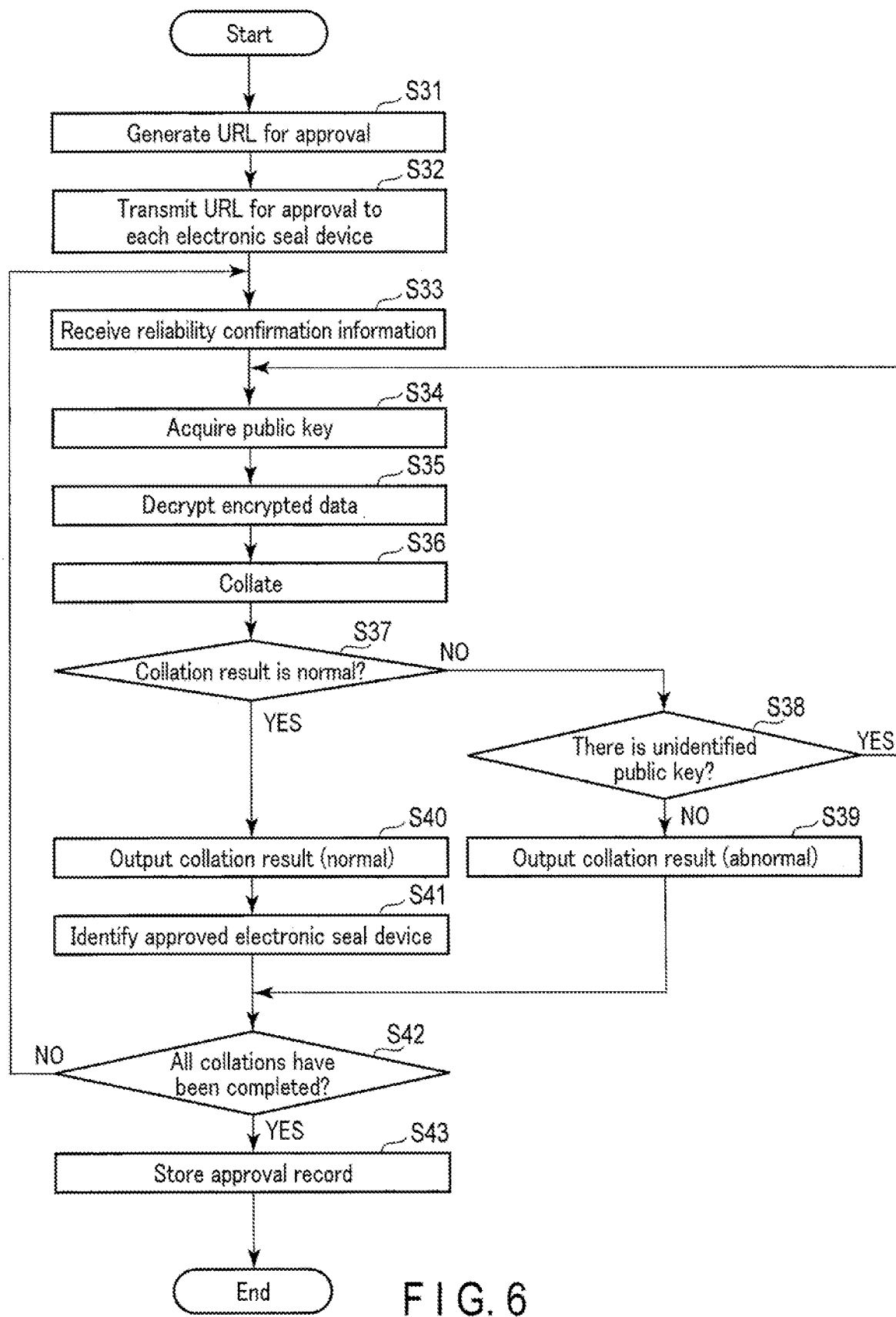
FIG. 6 is an illustration of another example of the operation of the electronic approval system according to the first embodiment.

FIG. 6 is an illustration of another example of the operation of the electronic seal system 1. FIG. 6 shows an example of a process related to an electronic imprint which is can be inserted into document data by the approval of a plurality of authorized persons. Specifically, it is a case such as "Electronic imprint #2" in FIG. 3.

The processor 21 of the electronic seal system server 11 generates a URL for approval based on document data and electronic imprint ID associated with the document data (step S31). For example, on the Web page of the URL for approval, an approval screen is displayed showing a display based on the document data, information indicating a required electronic imprint image (e.g., electronic imprint ID), and information indicating a plurality of electronic seal devices 14 for which approval is required (electronic seal ID). Note that different approval screens (different approval URLs) may be generated for the electronic seal devices 14, respectively.

The processor 21 of the electronic seal system server 11 transmits a URL for approval to the information processing device 13 for each of the electronic seal devices 14 (step S32). Note that information indicating a transmission destination may be associated with the electronic seal devices 14 (or electronic seal ID). That is, the processor 21 transmits the URL for approval to the transmission destination associated with a plurality of electronic seal IDs associated with the electronic imprint IDs.

The holder (authorized person) of an electronic seal device 14 performs the processes of steps S15 to S20 in FIG.

5 by the information processing device 13 and electronic seal device 14 to transmit reliability confirmation information to the electronic seal system server 11.

The processor 21 of the electronic seal system server 11 receives reliability confirmation information from the electronic seal device 14 (step S33). Upon receiving the reliability confirmation information from the electronic seal device 14, the processor 21 transmits the reliability confirmation information and the electronic imprint ID to the management server 12.

The processor 31 of the management server 12 acquires from the memory 32 one public key associated with the electronic imprint ID transmitted from the electronic seal system server 11 (step S34).

The processor 31 decrypts the encrypted data (hash value) of the reliability confirmation information using the acquired public key (step S35).

The processor 31 collates the decrypted value of the encrypted data with the random number of the reliability confirmation information (step S36). The processor 31 determines whether a result of the collation is normal (step S37). If the decrypted value of the encrypted data coincides with the random number of the reliability confirmation information, the processor 31 determines that the collation result is normal. If the decrypted value of the encrypted data does not coincide with the random number of the reliability confirmation information, the processor 31 determines that the collation result is abnormal.

If the processor 31 determines that the collation result is not normal (it is abnormal), it determines whether there is an unidentified public key (step S38). That is, the processor 31 determines whether there is a public key that has not yet been used for collation among the public keys associated with the electronic imprint ID.

When the processor 31 determines that there is an unidentified public key (Yes in step S38), it performs the process of step S34 again. Thus, the processor 31 acquires another public key and performs collation.

If the processor 31 determines that there is no unidentified public key (No in step S38), it transmits a collation result indicating an abnormality to the electronic seal system server 11 (step S39).

If the processor 31 determines in step S37 that the collation result is normal (Yes in step S37), it transmits a collation result indicating normal to the electronic seal system server 11 (step S40). If the processor 31 determines that the collation result is normal, it transmits the electronic seal ID corresponding to the public key used for decrypting the encrypted data to the electronic seal system server 11 together with the collation result.

If the processor 21 of the electronic seal system server 11 receives a collation result indicating normal, it identifies the approved electronic seal device 14 (step S41). For example, the processor 21 identifies the approved electronic seal device 14, based on the electronic seal ID transmitted from the management server 12 together with the collation result indicating normal. That is, the electronic seal system server 11 and management server 12 can determine which electronic seal device 14 was used for the approval, based on which public key was used to determine that the collation result is normal. In addition, based on the identified result, the processor 21 performs a process of erasing the electronic seal ID corresponding to the electronic imprint ID used to generate the URL for approval in step S31. That is, the processor 21 performs a process of erasing the electronic seal ID transmitted from the management server 12 together with the collation result indicating normal, from the electronic seal IDs associated with the electronic imprint ID used for generating the URL for approval.

The processor 21 determines whether all collations have been completed (step S42). That is, the processor 21 determines whether there is an electronic seal ID that is not erased because it receives no collation result indicating normal, among a plurality of electronic seal IDs associated with the electronic imprint ID transmitted to the management server 12. If all of the electronic seal IDs associated with the electronic imprint ID are erased, the processor 21 determines that all the collations have been completed. That is, the processor 21 determines that all of the electronic seal devices 14 associated with the electronic imprint ID have been approved by the authorized person.

If the processor 21 determines that not all the collations have been completed (No in step S42), it proceeds to the process of step S33. The processor 21 thus waits for the transmission of reliability confirmation information from another electronic seal device 14.

If the processor 21 determines that all the collations have been completed (Yes in step S42), it stores an approval record (step S43) and terminates the process of FIG. 6. That is, if the collation of all the electronic seal devices 14 associated with the electronic imprint ID is normally completed, the processor 21 stores an electronic imprint image in association with the document data.

As described above, the processor 21 of the electronic seal system server 11 of the electronic seal system 1 stores an electronic approval record based on the collation results based on the reliability confirmation information generated using a private key in the electronic seal devices 14 and the public key corresponding to the private key. Thus, the electronic seal system 1 can store a record that is approved by the authorized person associated with each of the electronic seal devices 14, in association with the document data.

With the foregoing configuration, the electronic seal system 1 can store an electronic approval record associated with the electronic seal device 14 held by each of a plurality of authorized persons, based on the approval of the authorized persons.

In the foregoing example, the electronic seal system server 11 transmits reliability confirmation information and electronic seal ID to the management server 12. It has been described that the management server 12 employs the public key associated with the electronic imprint ID to collate the reliability confirmation information by a brute force attack, but the example is not limited to this configuration. The electronic seal system server 11 may be configured to transmit only the reliability confirmation information to the management server 12. In this case, the management server 12 employs the managed public key to collate the reliability confirmation information by brute force attack. In addition, the management server 12 transmits a collation result and an electronic imprint ID associated with the public key in which the collation result is normal to the electronic seal system server 11. Even with such a configuration, the electronic seal system 1 can store the electronic approval record associated with the electronic seal device 14 held by each of the authorized persons, based on the approval of the authorized persons.

The management server 12 may also transmit the result of collation with a public key to the electronic seal system server 11 each time collation is performed. In this case, the electronic seal system server 11 transmits the reliability confirmation information received from the electronic seal device 14, the electronic seal ID of the electronic seal device 14, and the electronic imprint ID to the management server 12. In this case, the management server 12 stores the electronic imprint ID, electronic seal ID and public key in the memory 32 in association with each other. The management server 12 collates with a public key corresponding to the received electronic imprint ID and corresponding to the received electronic seal ID, based on the received reliability confirmation information. The management server 12 transmits the collation result (normal or abnormal) to the electronic seal system server 12. Even with such a configuration, the electronic seal system 1 can store the electronic approval record associated with the electronic seal device 14 held by each of the authorized persons, based on the approval of the authorized persons. This configuration makes it unnecessary to collate the public key, which is held by the management server 12, by brute force attack. The management server 12 can thus be decreased in its processing load.

It has been described that in the foregoing example, the electronic seal system 1 stores an electronic approval record based on the approval of the holders (authorized persons) of all the electronic seal devices 14 associated with the electronic imprint ID, but the example is not limited to this configuration. The electronic seal system 1 may be configured to store an electronic approval record based on the approval of any of the holders (authorized persons) of the electronic seal devices 14 associated with the electronic imprint ID. In this case, the processor 21 of the electronic seal system server 11 has the foregoing configuration that can be attained by excluding step S42 in FIG. 6.

Second Embodiment

Figure 7:
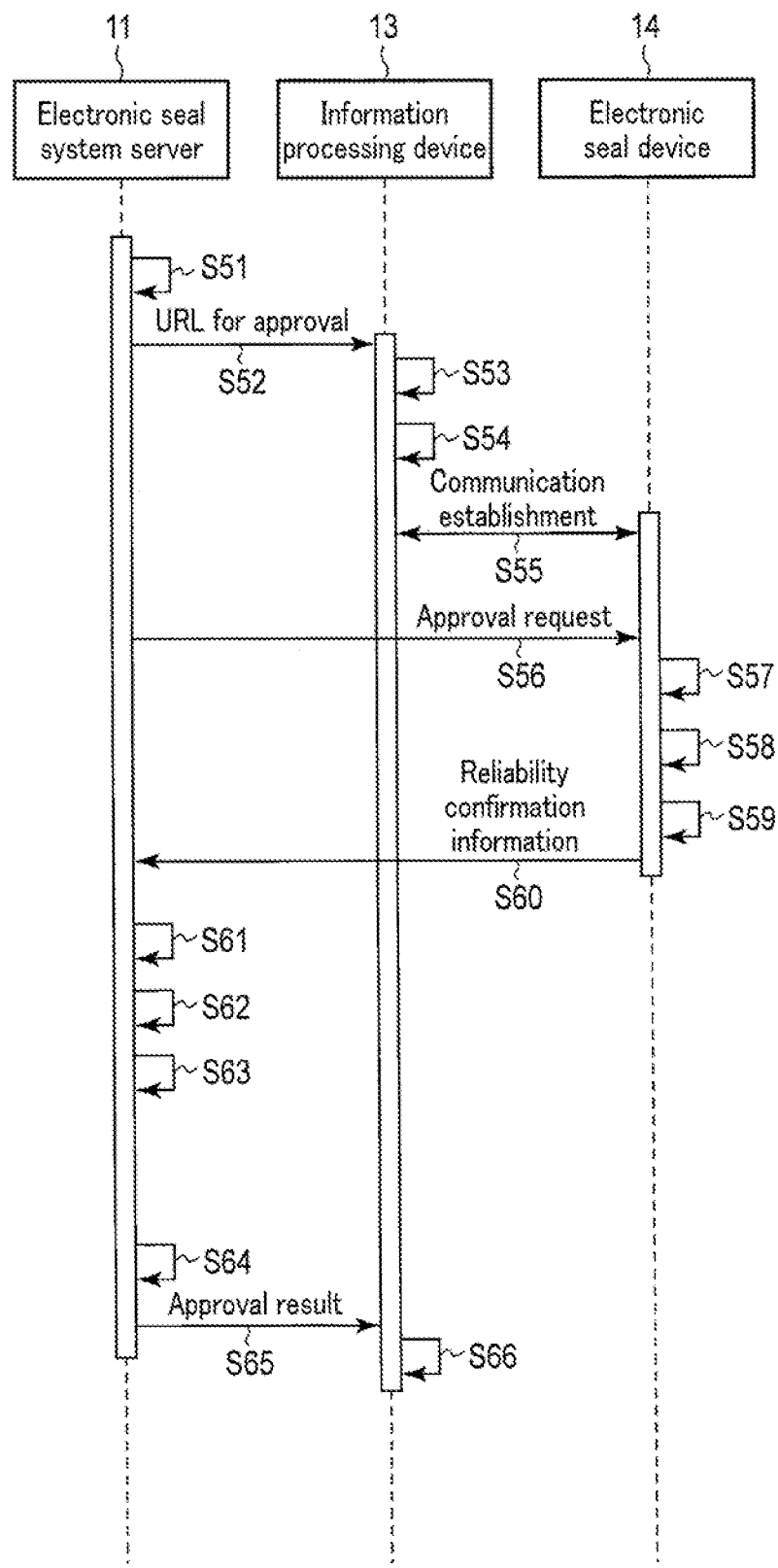
FIG. 7 is an illustration of an example of an operation of an electronic approval system according to a second embodiment.

FIG. 7 is an illustration of an electronic seal system 1 according to a second embodiment. The electronic seal system 1 of the second embodiment differs from that of the first embodiment in that the electronic seal system server 11 has the function of the management server 12. Note that since the configuration of the hardware of the electronic seal system server 11 is similar to that in the first embodiment, the same reference symbols are attached and their corresponding configurations will not be described. In this embodiment, the memory 22 of the electronic seal system server 11 stores document data into which an electronic imprint image is inserted, "electronic imprint image," "electronic imprint ID," "electronic seal ID" and "public key" in correspondence with each other.

The processor 21 of the electronic seal system server 11 generates a URL for approval based on the document data and the electronic imprint ID associated with the document data (step S51).

The processor 21 transmits the URL for approval to the information processing device 13 that is operated by a user targeted for electronic approval (a holder of the electronic seal device 14) (step S52).

The processor 41 of the information processing device 13 gains access to the URL for approval based on the operation of the operation interface 45 to display a screen for approval on the display 44 (step S53).

If the processor 41 accepts the operation on the screen for approval (step S54), it establishes wireless communication with the electronic seal device 14 (step S55).

If wireless communication is established between the information processing device 13 and the electronic seal device 14, the processor 21 of the electronic seal system server 11 transmits a request for approval to the electronic seal device 14 via the information processing device 13 (step S56).

Upon receiving the request for approval, the electronic seal device 14 performs biometric authentication (fingerprint authentication in this embodiment) (step S57).

If the biometric authentication result is normal, the electronic seal device 14 generates random numbers using a random number generator of the security chip 55 (step S58).

In addition, the electronic seal device 14 encrypts the random numbers using an encryption circuit of the security chip 55 (step S59).

The processor 51 of the electronic seal device 14 transmits the random numbers and encrypted data to the electronic seal system server 11 as reliability confirmation information via the information processing device 13 (step S60).

Upon receiving the reliability confirmation information from the electronic seal device 14, the processor 21 of the electronic seal system server 11 determines whether the authorized holder (authorized person) has approved it in the electronic seal device 14 based on the reliability confirmation information and the already registered information.

First, the processor 21 of the electronic seal system server 11 acquires from the memory 22 a public key associated with the electronic imprint ID used for generating the URL for approval in step S51 (step S61).

The processor 21 decrypts the encrypted data (hash value) of the reliability confirmation information using the acquired public key (step S62).

The processor 21 collates a decrypted value of the encrypted data with the random number of the reliability confirmation information (step S63). If the decrypted value of the encrypted data matches the random number of the reliability confirmation information, the processor 21 determines that the collation result is normal. If they do not match each other, the processor 21 determines that the collation result is abnormal.

The processor 21 stores an approval record based on the collation result (step S64). If the collation result is normal, the processor 21 stores an electronic imprint image as an electronic approval record in association with document data.

The processor 21 generates an approval result screen showing an approval result and transmits it to the information processing device 13 (step S65).

The processor 41 of the information processing device 13 causes the display 44 to display a screen showing the received approval result (step S66). Accordingly, the authorized person who operates the information processing device 13 can confirm that the electronic approval record has been recorded normally in the electronic seal system server 11.

As described above, the management server 12 of the electronic seal system 1 can be excluded. Thus, the configuration of the electronic seal system 1 can be simplified.

Third Embodiment

Figure 8:
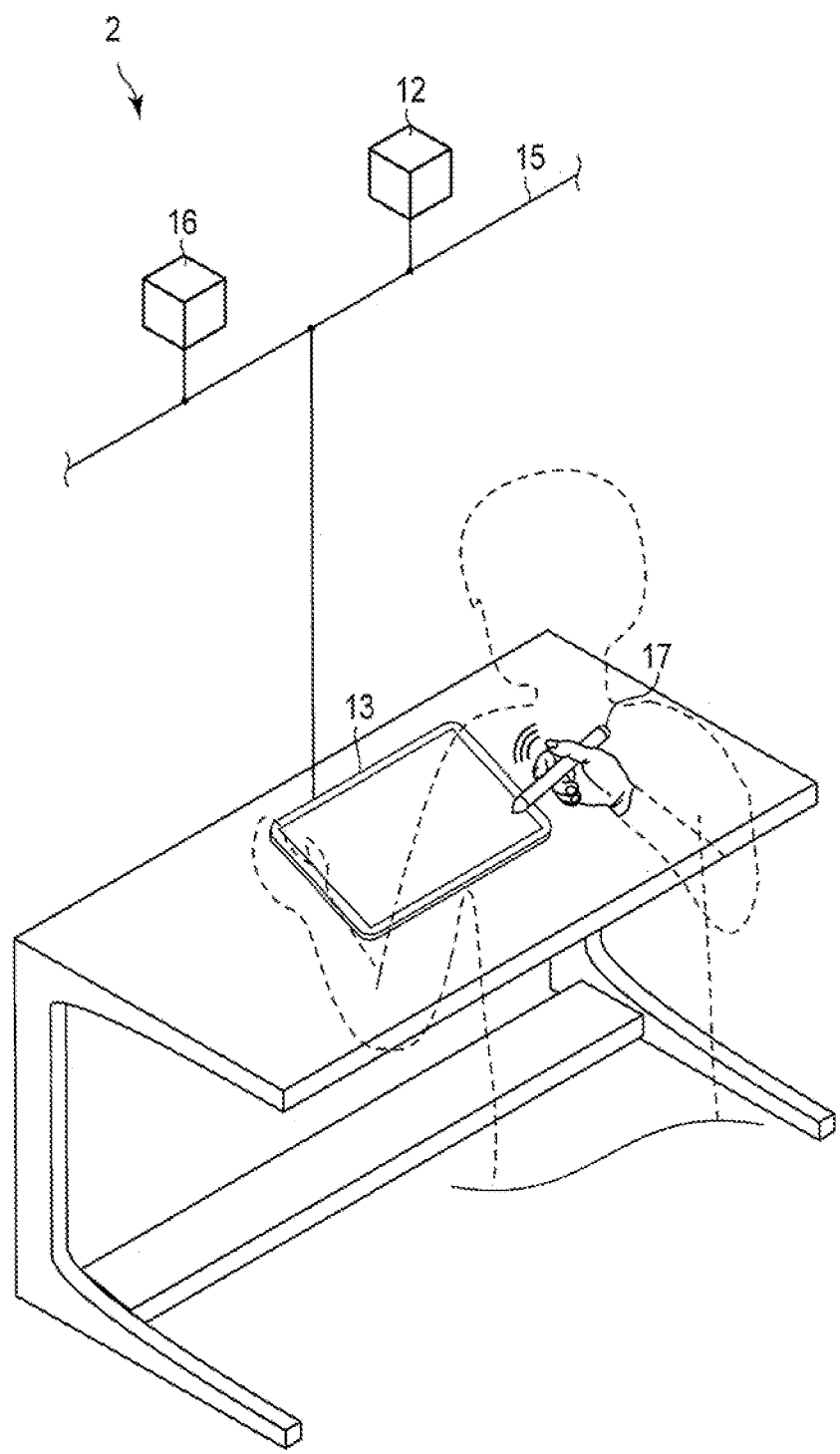
FIG. 8 is an illustration of an example of an operation of an electronic approval system according to a third embodiment.

FIG. 8 is an illustration of an electronic signature system 2 that is an electronic approval system according to a third embodiment. The electronic signature system 2 of the third embodiment differs from that of the first embodiment in that a pen-type electronic signature device is used instead of the electronic seal device 14. Note that a detailed description of the configuration similar to that of the first embodiment will be omitted, and different points will be described.

The electronic signature system 2 includes an electronic signature system server 16, a management server 12, an information processing device 13, at least one electronic signature devices 17, and the like.

The electronic signature system server 16 is an electronic approval server that performs a process related to electronic approval. The electronic signature system server 16 includes a processor 21, a memory 22 and a communication unit 23. That is, the electronic signature system server 16 has a configuration similar to that of the electronic seal system server 11.

The electronic signature device 17 is a device that is operated by a user to insert an electronic signature image into document data. The electronic signature device 17 performs biometric authentication based on user's biometric information (e.g. fingerprints, vein patterns, iris, and facial features).

The electronic signature device 17 includes a processor 51, a memory 52, a communication unit 53, a biosensor 54, a security chip 55 and a battery 56. The electronic signature device 17 may also include an indicator, a speaker or the like, which is not shown. That is, the electronic signature device 17 has a configuration similar to that of the electronic seal device 14.

In addition, the electronic signature device 17 has a function of generating an electronic signature image, which will be described later.

For example, the electronic signature device 17 is configured as a pointing device that supplies an operation signal to the information processing device 13 configured as a touch panel. In this case, the user of the electronic signature device 17 performs a signature operation on the display 44 of the information processing device 13 using the electronic signature device 17. The processor 41 of the information processing device 13 generates an electronic signature image based on the locus of the electronic signature device 17.

For example, the electronic signature device 17 may be configured to generate an electronic signature image by itself. For example, the electronic signature device 17 may include a light and a sensor that reads light reflected from the light to determine the locus of the electronic signature device 17, based on the output of the sensor, and generate an electronic signature image.

Next is a description of information stored in the memory 22 of the electronic signature system server 16 or the memory 32 of the management server 12.

Figure 9:
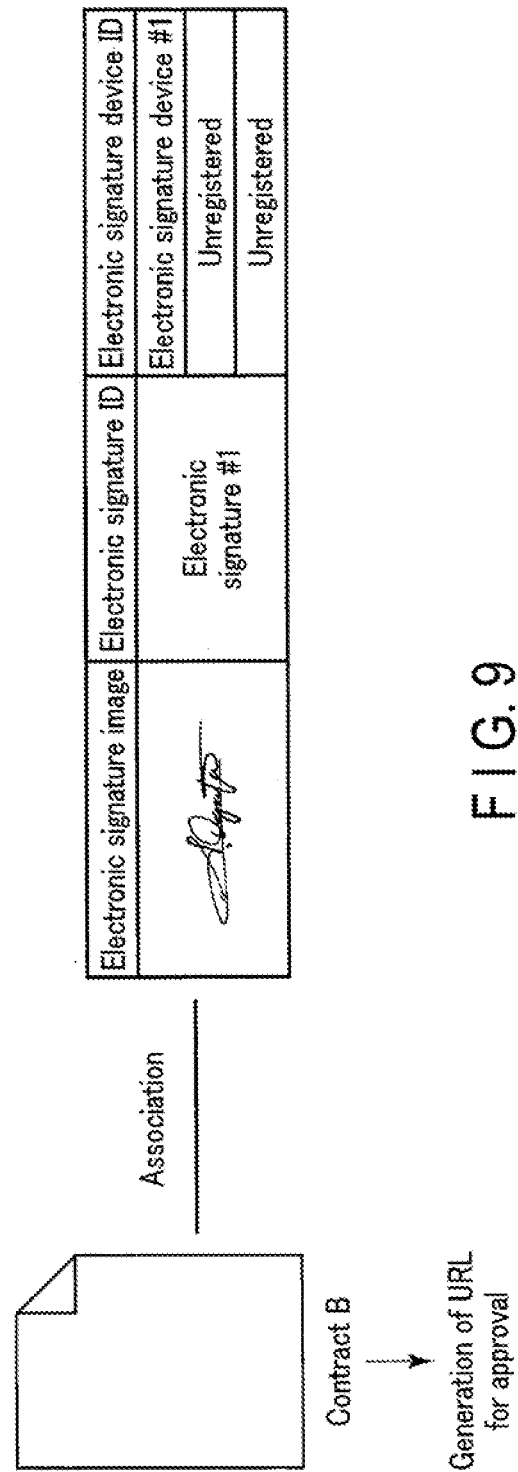
FIG. 9 is an illustration of an example of data stored in a server of the electronic approval system according to the third embodiment.

FIG. 9 is an illustration of the information stored in the memory 22 of the electronic signature system server 16 or the memory 32 of the management server 12.

In this embodiment, document data to which an electronic approval record is given, "electronic signature device ID" and "public key" are stored in the memory 22 of the electronic signature system server 16 or the memory 32 of the management server 12 in correspondence with each other. In addition, a storage area in which the "electronic signature ID" and "electronic signature image" are stored is provided the memory 22 of the electronic signature system server 16 or the memory 32 of the management server 12 in correspondence with the "electronic signature device ID." The "electronic signature ID" and "electronic signature image" are stored in the memory 22 of the electronic signature system server 16 or in the memory 32 of the management server 12 through a registration process to be described later.

The electronic signature image is a form of electronic approval record attached to document data. The electronic signature image is formed as an image superposed (inserted) and displayed on, for example, document data. The electronic signature image is an image generated by the electronic signature device 17 described above.

The electronic signature ID is identification information to identify an electronic signature image.

The electronic signature device ID is identification information to identify the electronic signature device 17.

The present embodiment will be described assuming that the storage area of the electronic signature image and electronic signature ID is provided in the memory 22 of the electronic signature system server 16 and that the storage area of the electronic signature ID, the electronic signature device ID and the public key are stored in the memory 32 of the management server 12 in correspondence with each other. In addition, the memory 22 of the electronic signature system server 16 stores document data to which an electronic approval record is given.

As shown in FIG. 9, electronic signature #1 is associated with the document data of "contract B." Electronic imprint #1 is identification information of an electronic signature image that needs to be inserted into the document data of "contract B."

Electronic signature device #1 and public key #1 are associated with electronic signature #1.

Note that one electronic signature device 17 may be associated with a plurality of electronic signature IDs.

Next is a description of information stored in the electronic signature device 17.

FIG. 10 is an illustration of information stored in the security chip 55 of the electronic signature device 17.

As shown in FIG. 10, the "electronic signature device ID," "private key," "biometric information" and the like are stored in the security chip 55 of the electronic signature device 17 in correspondence with each other. Note that the electronic signature device 17 may be so configured that one or some of the "electronic signature device ID," "private key" and "biometric information" are stored in the memory 52.

The private key is an encryption key corresponding to the public key associated with the electronic signature device ID of the electronic signature device 17 in the management server 12. The private key is used to generate reliability confirmation information.

Assume that a user DEF holds an electronic signature device 17 whose electronic signature device ID is "electronic signature device #1" as shown in FIG. 10. In this case, "biometric information #1" that is biometric information of the user DEF and "private key #1" are stored in the memory of the security chip 55. The "private key #1" is an encryption key corresponding to the "public key #1" associated with the "electronic signature device #1" in the management server 12.

In the electronic signature system 2, at least one electronic signature device 17 is provided for a user (authorized person). The authorized person gains access to a Web page for registration of the electronic signature device 17 by the information processing device 13. The authorized person connects the electronic signature device 17 with the information processing device 13. The authorized person causes the electronic signature device 17 and information processing device 13 to generate an electronic signature image corresponding to the operation of the electronic signature device 17. In addition, the biometric information can be registered in the security chip 55 of the electronic signature device 17 by causing the biosensor 54 of the electronic signature device 17 to read the biometric information (fingerprint image) of the authorized person. If the biometric information has been registered, the electronic signature device 17 transmits the fact that the biometric information has been registered, the electronic signature image and the electronic signature device ID to the electronic signature system server 16 via the information processing device 13. Accordingly, the electronic signature device 17 is validated in the electronic signature system server 16.

Figure 11:
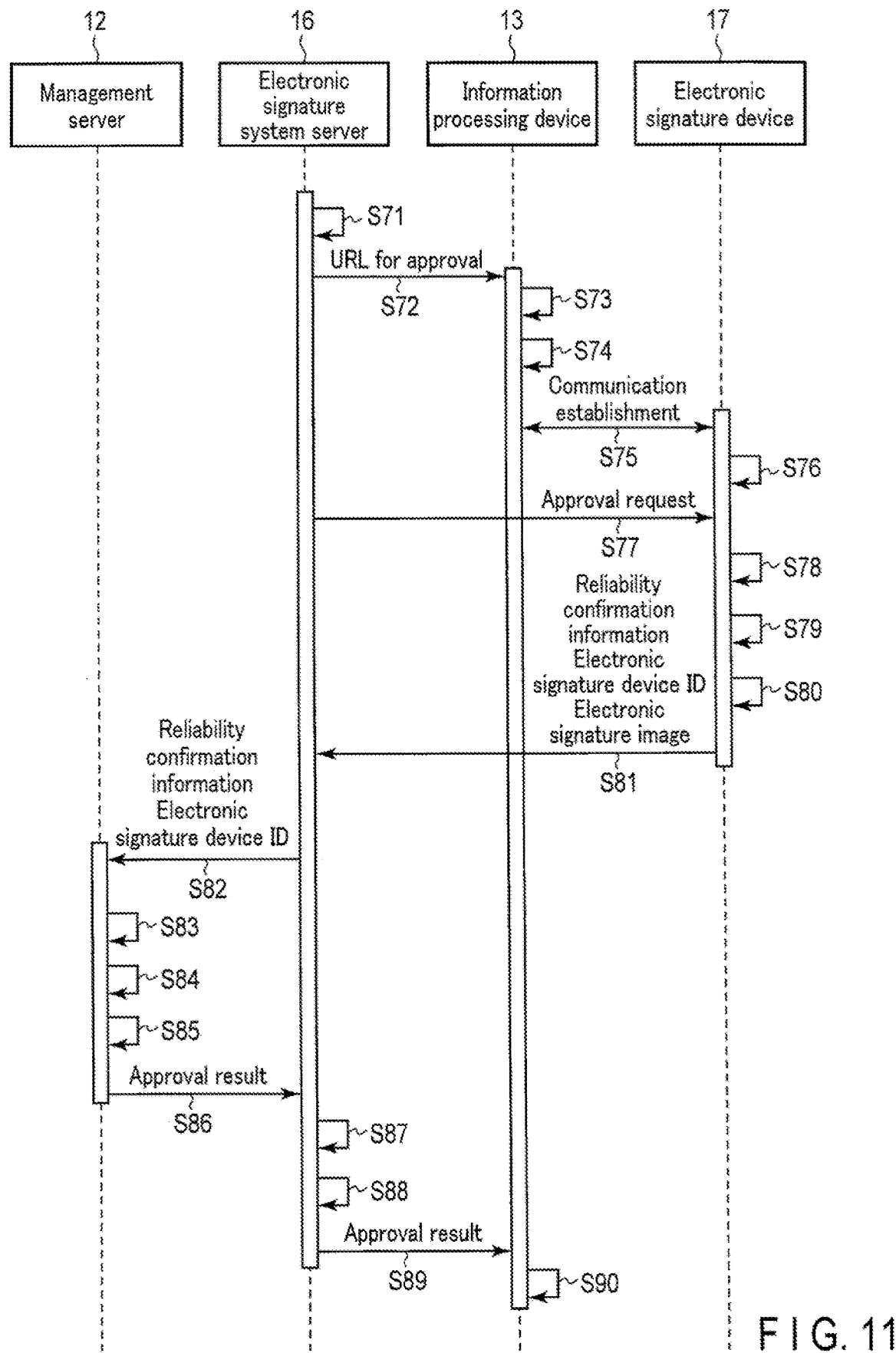
FIG. 11 is an illustration of an example of the operation of the electronic approval system according to the third embodiment.

FIG. 11 is a sequence diagram illustrating an operation of the electronic signature system 2. Note that FIG. 11 illustrates an example of a process related to an electronic signature that can be inserted into document data by the approval of a single authorized person.

The processor 21 of the electronic signature system server 16 generates a URL for approval based on document data and electronic signature ID associated with the document data (step S71). For example, on the Web page of the URL for approval, an approval screen is displayed showing the display based on the document data and information indicating that the electronic signature is required.

For example, the processor 21 of the electronic signature system server 16 transmits the URL for approval to the information processing device 13 operated by a user who needs to receive electronic approval (holder of the electronic signature device 17) (step S71).

The processor 41 of the information processing device 13 gains access to the URL for approval based on the operation of the operation interface 45, and displays the approval screen on the display 44 (step S73). The holder of the electronic signature device 17, that is, the authorized person thereof, visually checks the approval screen displayed on the display 44 to confirm that he or she is a user who needs to receive electronic approval. The holder of the electronic signature device 17 inputs an operation for electronic approval through the operation interface 45.

Upon receiving the operation on the approval screen (step S74), the processor 41 establishes wireless communication with the electronic signature device 17 (step S75).

The holder of the electronic signature device 17 performs an operation to generate an electronic signature image using the information processing device 13 and the electronic signature device 17 (step S76). That is, the authorized person causes the electronic signature device 17 and the information processing device 13 to generate an electronic signature image corresponding to the operation of the electronic signature device 17.

If wireless communication is established between the information processing device 13 and the electronic signature device 17, the processor 21 of the electronic signature system server 16 transmits an approval request to the electronic signature device 17 via the information processing device 13 (step S77).

Upon receiving the approval request, the electronic signature device 17 performs biometric authentication (fingerprint authentication in this embodiment) (step S78). For example, the processor 51 of the electronic signature device 17 makes display to urge the authorized person to perform fingerprint authentication on an indicator, a speaker or a display 44 of the information processing device 13, which is not shown. The processor 51 activates the biosensor 54. The processor 51 acquires an image of authorized person's fingerprints by the biosensor 54. The processor 51 supplies the fingerprint image to the security chip 55. The security chip 55 performs biometric authentication based on preset biometric information (feature points extracted from the fingerprints) and input fingerprint image, and outputs a result to the processor 51.

If the result of biometric authentication is normal, the electronic signature device 17 generates random numbers using the random number generator of the security chip 55 (step S79). If the result of biometric authentication is normal, the processor 51 instructs the security chip 55 to generate random numbers. The security chip 55 generates random numbers using the random number generator and outputs the random numbers to the processor 51.

In addition, the electronic signature device 17 encrypts the random numbers using the encryption circuit of the security chip 55 (step S80). Specifically, the security chip 55 inputs the private key stored in advance and the random numbers into the encryption circuit, and acquires encrypted data in which the random numbers are encrypted by the private key. More specifically, the security chip 55 performs a hash calculation based on the private key and the random numbers to acquires a hash value as the encrypted data. The security chip 55 outputs the encrypted data (hash value) to the processor 51.

The processor 51 of the electronic signature device 17 transmits the random numbers and encrypted data to the electronic signature system server 16 as reliability confirmation information via the information processing device 13 (step S81). The processor 51 of the electronic signature device 17 transmits the generated electronic signature image and electronic signature device ID together with the reliability confirmation information. That is, if the biometric authentication result is normal, the electronic signature device 17 transmits to the electronic signature server 16 the reliability confirmation information that is generated using the private key stored by itself, the electronic signature image and the electronic signature device ID. Note that the information processing device 13 may be configured to temporarily store the electronic signature image generated in step S76 and transmit it to the electronic signature system server 16.

Upon receiving the reliability confirmation information from the electronic signature device 17, the processor 21 of the electronic signature system server 16 determines whether the authorized holder (authorized person) is approved in the electronic signature device 17, based on the reliability confirmation information and the already registered information. That is, the processor 21 determines whether to attach an electronic signature image to document data, based on the already registered information such as "electronic signature device ID" and "public key" and the reliability confirmation information.

First, the processor 21 of the electronic signature system server 16 transmits the reliability confirmation information received from the electronic signature device 17 and the electronic signature device ID to the management server 12 (step S82).

The processor 31 of the management server 12 acquires from the memory 32 the public key associated with the electronic signature device ID transmitted from the electronic signature system server 16 (step S83).

The processor 31 decrypts the encrypted data (hash value) of the reliability confirmation information using the acquired public key (step S84).

The processor 31 collates the decrypted value of the encrypted data with the random number of the reliability confirmation information (step S85).

The processor 31 transmits the collation result to the electronic signature system server 16 (step S86).

The processor 21 of the electronic signature system server 16 stores approval record based on the collation result from the management server 12 (step S87). If the collation result received from the management server 12 is normal, the processor 21 stores an electronic signature image, which is transmitted from the information processing device 13 and electronic signature device 17, as electronic approval record in association with document data.

In addition, the processor 21 of the electronic signature system server 16 stores the electronic signature image and the electronic signature ID in the memory 22 based on the collation result from the management server 12 (step S88). That is, if the collation result received from the management server 12 is normal, the processor 21 performs a registration process to associate the electronic signature image, electronic signature ID and electronic signature device ID, which are transmitted from the information processing device 13 and electronic signature device 17 in step S81, with each other and store them in the memory 22. The processor 21 also associates the electronic signature ID and the electronic signature device ID with each other and transmits them to the management server 12. The processor 31 of a management server 12 associates the electronic signature ID and electronic signature device ID with each other and stores them in the memory 32.

The processor 21 of the electronic signature system server 16 generates an approval result screen showing the approval result and transmits it to the information processing device 13 (step S89). For example, the processor 21 generates a screen in which an electronic signature image is superposed on the display of document data, as the approval result screen.

The processor 41 of the information processing device 13 causes the display 44 to display a screen showing the received approval result (step S90). Accordingly, the authorized person who operates the information processing device 13, can confirm that the electronic approval record has been recorded normally in the electronic signature system server 16.

As described above, the processor 21 of the electronic signature system server 16 of the electronic signature system 2 stores the electronic approval record, based on the reliability confirmation information generated using the private key in the electronic signature device 17 and the collation result based on the public key corresponding to the private key. Thus, the electronic signature system 2 can store the record that the authorized person associated with the electronic signature device 17 has been approved, in association with the document data.

Like in the first embodiment, the foregoing configuration makes it possible to register the image of signature of the authorized person as electronic approval record even though an electronic imprint image is not registered in advance.

It should be noted that the functions described in each of the above embodiments are not only configured using hardware, but can also be achieved by causing a computer to read programs describing the functions using software. Each of the functions may be configured by selecting software or hardware as appropriate. In addition, the programs according to the present embodiment may be transferred while being stored in an electronic device or while not being stored therein. In the latter case, the programs may be transferred via the network or stored on a storage medium. The storage medium is a non-transitory tangible medium. The storage medium is a computer-readable medium that is read and executed by the electronic seal system server 11, the electronic seal device 14, and the like. It does not matter how the storage medium is formed if the storage medium is a medium which can store programs of CD-ROMs, memory cards and the like and which can be read by a computer.

While certain embodiments have been described, these embodiments have been presented by way of example only, and are not intended to limit the scope of the inventions. The novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic approval system comprising at least one electronic approval device and an electronic approval server,
the electronic approval device including:
a first connector which communicates with the electronic approval server via an information processing device;
a biosensor which performs biometric authentication; and
a security chip which generates reliability confirmation information using a private key stored in advance if a result of the biometric authentication is normal, and which transmits the reliability confirmation information to the electronic approval server via the information processing device, and
the electronic approval server including:
a second connector which communicates with the electronic approval device via the information processing device; and
a processor which stores an electronic approval record indicating that approval has been successfully performed in the electronic approval device based on a public key corresponding to the private key and the reliability confirmation information,
wherein the processor stores the electronic approval record based on the reliability confirmation information generated in a plurality of electronic approval devices in which different private keys are set in association with the electronic approval record, and a public key corresponding to the private key for each of the electronic approval devices.

2. The electronic approval system of claim 1, wherein the processor stores the electronic approval record if approval is successfully performed in all of the at least one electronic approval devices associated with the electronic approval record.

3. The electronic approval system of claim 1, wherein:
the electronic approval record is an electronic imprint image; and
the processor stores the electronic approval record by inserting the electronic imprint image into document data.

4. The electronic approval system of claim 1, wherein the processor:
transmits to an external server the reliability confirmation information received from the at least one electronic approval device and electronic approval record identification information for identifying the electronic approval record; and
receives from the external server information indicating whether approval in the at least one electronic approval device has been successfully performed.

5. The electronic approval system of claim 1, wherein:
the electronic approval record is an electronic signature image; and
the processor stores the electronic approval record by inserting the electronic signature image into document data.

6. The electronic approval system of claim 1, wherein:
the reliability confirmation information is a random number and encrypted data in which the random number is encrypted by a private key; and
the processor stores the electronic approval record if the encrypted data decrypted by the public key matches the random number.

7. An electronic approval server comprising:
a connector that communicates via an information processing device and an electronic approval device including a biosensor which performs biometric authentication and a security chip which generates reliability confirmation information using a private key stored in advance when a result of the biometric authentication is normal; and
a processor which stores an electronic approval record indicating that approval in the electronic approval device has been successfully executed based on a public key corresponding to the private key and the reliability confirmation information,
wherein the processor stores the electronic approval record based on the reliability confirmation information generated in a plurality of electronic approval devices in which different private keys are set in association with the electronic approval record, and a public key corresponding to the private key for each of the electronic approval devices.

8. A computer-readable storage medium storing an electronic approval program,
the computer-readable storage medium causing an electronic approval device to:
communicate with an electronic approval server via an information processing device;
perform biometric authentication;
generate reliability confirmation information using a private key stored in advance if a result of the biometric authentication is normal; and
transmit the reliability confirmation information to the electronic approval server via the information processing device, and
the computer-readable storage medium causing the electronic approval server to:
communicate with the electronic approval device via the information processing device; and
store an electronic approval record indicating that approval in the electronic approval device has been successfully executed based on a public key corresponding to the private key and the reliability confirmation information,
wherein the electronic approval server stores the electronic approval record based on the reliability confirmation information generated in a plurality of electronic approval devices in which different private keys are set in association with the electronic approval record, and a public key corresponding to the private key for each of the electronic approval devices.

\* \* \* \* \*